No. 661,145. Patented Nov. 6, 1900.
O. HAUSMANN.
ATTACHMENT FOR BICYCLES.
(Application filed Aug. 6, 1900.)
(No Model.)
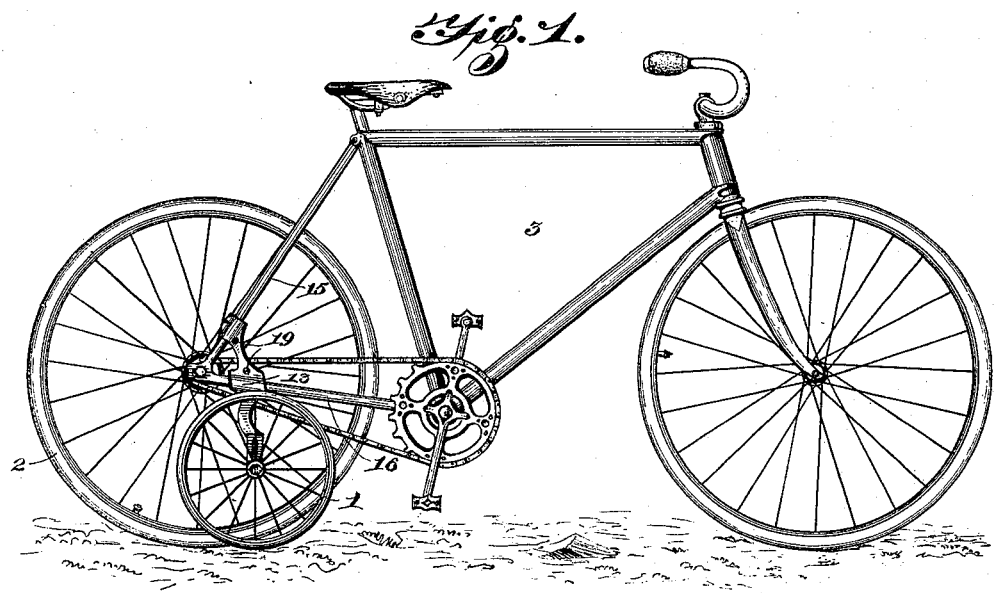
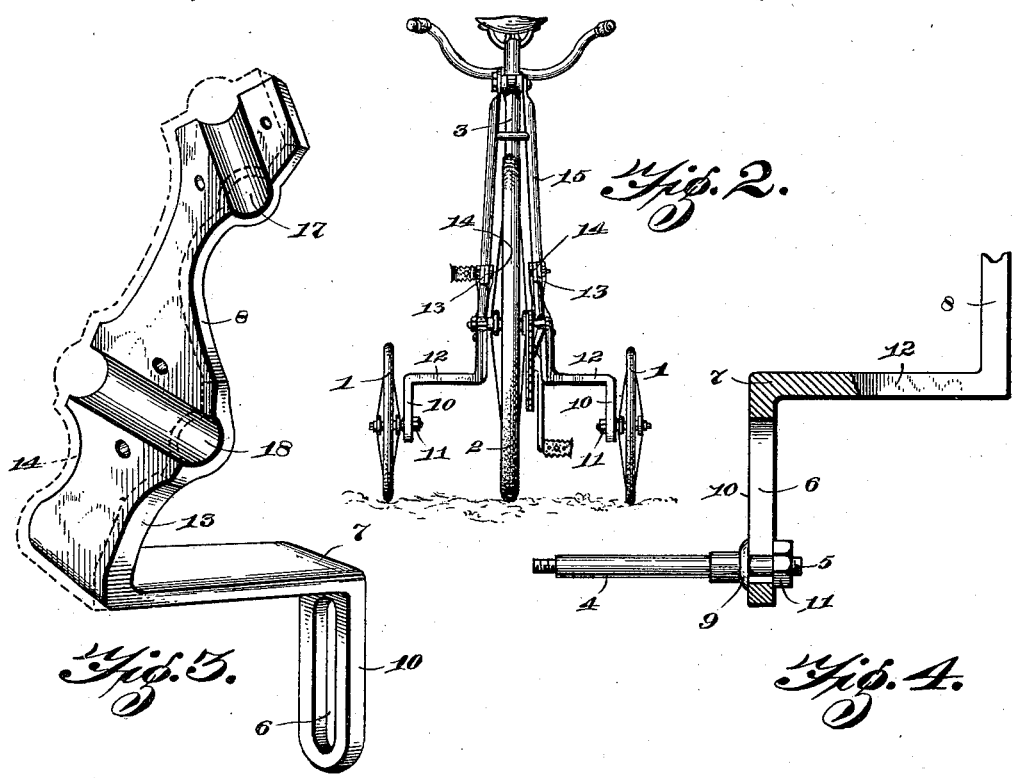

UNITED STATES PATENT OFFICE.

OTTO HAUSMANN, OF MINNEAPOLIS, MINNESOTA.

ATTACHMENT FOR BICYCLES.

SPECIFICATION forming part of Letters Patent No. 661,145, dated November 6, 1900.

Application filed August 6, 1900. Serial No. 26,083. (No model.)

*To all whom it may concern:*

Be it known that I, OTTO HAUSMANN, a citizen of the United States, residing at Minneapolis, in the county of Hennepin and State of Minnesota, have invented a new and useful Attachment for Bicycles, of which the following is a specification.

The invention relates to improvements in attachments for bicycles.

One object of the present invention is to improve the construction of that class of attachments which are adapted to prevent a bicycle from tipping over and to provide a simple, inexpensive, and efficient device of this character adapted to maintain a bicycle in an upright position when the same is subjected to a heavy weight.

Another object of the invention is to provide a device adapted to render a bicycle safe and steady for heavy and elderly people and to enable the device to strengthen the frame of the bicycle.

The invention consists in the construction and novel combination and arrangement of parts hereinafter fully described, illustrated in the accompanying drawings, and pointed out in the claim hereto appended.

In the drawings, Figure 1 is a side elevation of a bicycle provided with an attachment constructed in accordance with this invention. Fig. 2 is a rear elevation of the same. Fig. 3 is a detail perspective view of the outer plate of the clamp. Fig. 4 is a detail sectional view illustrating the manner of adjustably mounting the spindles for the supplemental balancing-wheels.

Like numerals of reference designate corresponding parts in all the figures of the drawings.

1 1 designate a pair of supplemental wheels located at opposite sides of the rear wheel 2 of a bicycle 3 and connected with the frame thereof by the means hereinafter described, and the said supplemental wheels 1 are spaced sufficiently from the rear wheel 2 of the bicycle to render the latter perfectly stable and safe for heavy and elderly or feeble persons, so that the bicycle will be retained positively in an upright position and will be prevented from falling over on either side. Each wheel 1 is mounted on a vertically-adjustable spindle 4, having its outer end threaded for the reception of a nut for securing the wheel 1 on it and provided at its inner end with a shank 5, arranged in a vertical slot 6 of an L-shaped portion 7 of a clamp 8. The spindle is provided at the inner end of the shank 5 with a collar or flange 9 for engaging the outer face of the slotted arm 10 of the L-shaped portion 7 of the clamp, and the end of the shank is threaded for the reception of a nut 11, which engages the inner face of the vertical arm of the L-shaped portion 7, whereby the spindle is firmly clamped at the desired adjustment and is rigidly connected with the said L-shaped portion of the clamp. The L-shaped portion 7 has its arm 10 arranged approximately vertical, and its other arm 12 is horizontal and extends outward from the lower end of an outer plate 13 of the clamp 8, the latter being composed of the outer plate 13 and an inner plate 14.

The clamp, which is disposed approximately vertical, connects the rear inclined bar 15 of the frame of the bicycle with the bottom brace 16 thereof, and thereby operates to strengthen and support the bicycle-frame and enable it to sustain a heavy weight. The rear or inner plate of the clamp is constructed the same as the outer plate, with the exception of being provided with the L-shaped portion 7, and the said inner or back plate fits against the outer or front plate, as illustrated in dotted lines in Fig. 3 of the accompanying drawings. These plates 13 and 14 are provided with upper and lower transverse grooves 17 and 18, formed by curving the plates outward and forming openings for the adjacent portions 15 and 16 of the frame of the bicycle. The plates conform to the configuration of the frame of the bicycle and are provided at opposite sides of the registering grooves with perforations for the reception of suitable fastening devices 19 for connecting the inner and outer plates of the clamp, whereby the latter is firmly secured to the bicycle-frame. The upper and lower grooves 17 and 18 are arranged at an angle to each other to conform to the angle of the bars 15 and 16 of the bicycle-frame, and by this construction the clamp is prevented from slipping in either direction on the bicycle-frame. The horizontal arms of the L-shaped portions of the clamps extend laterally from opposite sides of the bicycle, as clearly shown in Fig. 2 of the drawings, and the vertical arms 10 depend from the outer terminals of the horizontal arms, and a wide support or base for the bicycle is thus provided. This support will maintain the bicycle in an upright position and will not interfere with the guiding of the same. The wheels 1 are vertically adjustable and the attachment is adapted to be readily applied to an ordinary bicycle and does not necessitate any alteration of the construction thereof.

It will be seen that the attachment is exceedingly simple and inexpensive in construction, that it is adapted to maintain the bicycle in an upright position, and that it will enable heavy and elderly persons to ride with safety. It will also be apparent that the attachment is adapted to strengthen and support the frame of the bicycle, and that it will assist the same in sustaining a heavy weight.

What I claim is—

In a device of the class described, the combination with a bicycle, of the approximately vertical clamp located at the back of the bicycle and connecting the rear bars at a point in advance of the rear axle and composed of the inner and outer plates fitted together and provided at their inner abutting faces with grooves forming openings for the said rear bars, fastening devices connecting the plates, the depending L-shaped portion formed integral with the lower end of the outer plate, a spindle adjustably mounted on the depending L-shaped portion, and a supplemental wheel arranged on the spindle, substantially as described.

In testimony that I claim the foregoing as my own I have hereto affixed my signature in the presence of two witnesses.

OTTO HAUSMANN.

Witnesses:
F. DEPPE,
A. C. MIDDELSTADT.